US011865497B2

United States Patent
Cravillon et al.

(10) Patent No.: US 11,865,497 B2
(45) Date of Patent: *Jan. 9, 2024

(54) MONOMETALLIC RHODIUM-CONTAINING FOUR-WAY CONVERSION CATALYSTS FOR GASOLINE ENGINE EMISSIONS TREATMENT SYSTEMS

(71) Applicant: BASF Corporation, Florham Park, NJ (US)

(72) Inventors: Janosch Cravillon, Hannover (DE); Stephan Siemund, Pattensen (DE); Attilio Siani, Shanghai (CN); Thomas Schmitz, Wunstorf (DE); Markus Kinne, Hannover (DE)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/452,826

(22) Filed: Oct. 29, 2021

(65) Prior Publication Data

US 2022/0118405 A1 Apr. 21, 2022

Related U.S. Application Data

(63) Continuation of application No. 16/323,148, filed as application No. PCT/EP2017/068775 on Jul. 25, 2017, now Pat. No. 11,185,819.

(30) Foreign Application Priority Data

Aug. 5, 2016 (EP) ..................................... 16182969

(51) Int. Cl.
*B01J 21/04* (2006.01)
*B01J 21/12* (2006.01)
(Continued)

(52) U.S. Cl.
CPC ....... *B01D 53/945* (2013.01); *B01D 53/9477* (2013.01); *B01J 23/464* (2013.01);
(Continued)

(58) Field of Classification Search
CPC . B01J 21/04; B01J 21/12; B01J 23/464; B01J 23/63; B01J 35/0006; B01J 35/04;
(Continued)

(56) References Cited

U.S. PATENT DOCUMENTS 4,171,288 A  10/1979  Keith et al.
7,506,504 B2 *  3/2009  Kumar ................ F01N 13/0097
                                                             422/177
(Continued)

FOREIGN PATENT DOCUMENTS

DE    10 2010 055 147 A1    6/2012
EP       2 650 042 A1    10/2013
(Continued)

OTHER PUBLICATIONS

International Search Report dated Oct. 12, 2017, PCT/EP2017/068775.
(Continued)

*Primary Examiner* — Cam N. Nguyen
(74) *Attorney, Agent, or Firm* — DLA Piper LLP (US)

(57) ABSTRACT

Catalyzed particulate filters comprise three-way conversion (TWC) catalytic material, which comprises rhodium as the only platinum group metal, that permeates walls of a particulate filter. Such catalyzed particulate filters may be located downstream of close-coupled three-way conversion (TWC) composites in an emission treatment system downstream of a gasoline direct injection engine for treatment of an exhaust stream comprising hydrocarbons, carbon monoxide, nitrogen oxides, and particulates.

19 Claims, 2 Drawing Sheets (51) Int. Cl.
  *B01J 23/46* (2006.01)
  *B01J 23/63* (2006.01)
  *B01J 35/00* (2006.01)
  *B01J 35/04* (2006.01)
  *B01J 35/10* (2006.01)
  *F01N 3/035* (2006.01)
  *F01N 3/10* (2006.01)
  *B01D 53/94* (2006.01)
  *B01J 37/02* (2006.01)

(52) U.S. Cl.
  CPC .......... *B01J 23/63* (2013.01); *B01J 35/0006* (2013.01); *B01J 35/04* (2013.01); *B01J 35/108* (2013.01); *B01J 37/0244* (2013.01); *F01N 3/035* (2013.01); *F01N 3/101* (2013.01); *B01D 2255/1025* (2013.01); *B01D 2255/2065* (2013.01); *B01D 2255/407* (2013.01); *B01D 2255/908* (2013.01); *B01D 2255/9155* (2013.01); *B01D 2258/014* (2013.01); *F01N 2330/06* (2013.01); *F01N 2510/06* (2013.01); *F01N 2510/068* (2013.01); *F01N 2510/0684* (2013.01); *Y02T 10/12* (2013.01)

(58) Field of Classification Search
  CPC ........ B01J 35/108; F01N 3/035; F01N 3/101; B01D 53/945; B01D 53/9477
  See application file for complete search history.

(56) References Cited

U.S. PATENT DOCUMENTS

| | | | |
|---|---|---|---|
| 8,173,087 B2 | 5/2012 | Wei et al. | |
| 8,211,393 B2* | 7/2012 | Arnold | B01D 53/9445 60/299 |
| 8,758,695 B2* | 6/2014 | Neubauer | B01J 37/0248 422/177 |
| 8,815,189 B2 | 8/2014 | Arnold et al. | |
| 9,352,279 B2* | 5/2016 | Greenwell | B01D 53/945 |
| 9,789,443 B2* | 10/2017 | Greenwell | B01J 35/10 |
| 9,931,596 B2* | 4/2018 | Zheng | B01J 37/0246 |
| 2008/0020922 A1 | 1/2008 | Li et al. | |
| 2009/0193796 A1 | 8/2009 | Wei et al. | |
| 2010/0003172 A1 | 1/2010 | Li et al. | |
| 2011/0030346 A1 | 2/2011 | Neubauer et al. | |
| 2011/0252773 A1 | 10/2011 | Arnold et al. | |
| 2015/0107228 A1 | 4/2015 | Kilingmann et al. | |
| 2018/0266289 A1 | 9/2018 | Otsuka et al. | |

FOREIGN PATENT DOCUMENTS

| | | |
|---|---|---|
| RU | 2 333 788 C2 | 9/2008 |
| WO | WO 2017/051459 | 3/2017 |

OTHER PUBLICATIONS

Technical Examination Report dated May 16, 2023, of counterpart Brazilian Patent Application No. 11 2019 001886-7 in English.
Office Action dated Aug. 4, 2023, of counterpart Canadian Patent Application No. 3,032,207.
Office Action dated Oct. 10, 2023, of counterpart Japanese Divisional Patent Application No. 2022-135079, and a machine generated translation.

* cited by examiner

MONOMETALLIC RHODIUM-CONTAINING FOUR-WAY CONVERSION CATALYSTS FOR GASOLINE ENGINE EMISSIONS TREATMENT SYSTEMS

This is a continuation of application Ser. No. 16/323,148, filed Feb. 4, 2019, which is now U.S. Pat. No. 11,185,819, issued on Nov. 30, 2021, which a national stage filing under 35 U.S.C. § 371 of International Application No. PCT/EP2017/068775, filed on Jul. 25, 2017, which claims the benefit of priority to EP Application No. 16182969.2, filed on Aug. 5, 2016; the disclosure of each of these applications are each incorporated herein by reference in their entirety.

TECHNICAL FIELD

This invention pertains generally to emission treatment systems having catalysts used to treat gaseous streams of gasoline engines containing hydrocarbons, carbon monoxide, and oxides of nitrogen in conjunction with particulates. More specifically, this invention is directed to a four-way converter (FWC), which comprises a three-way conversion (TWC) catalyst that is monometallic, comprising rhodium only, and a particulate filter.

BACKGROUND

Particulate emissions for gasoline engines are being subject to regulations, including Euro 6 (2014) standards. Certain gasoline direct injection (GDI) engines have been developed whose operating regimes result in the formation of fine particulates. Aftertreatment systems for gasoline engines need to achieve particulate matter standards. In contrast to particulates generated by diesel lean burning engines, the particulates generated by gasoline engines, such as GDI engines, tend to be finer and in lesser quantities. This is due to the different combustion conditions of a diesel engine as compared to a gasoline engine. For example, gasoline engines run at a higher temperature than diesel engines. Also, hydrocarbon components are different in the emissions of gasoline engines as compared to diesel engines.

Emissions of unburned hydrocarbons, carbon monoxide and nitrogen oxide contaminants continue to be regulated. Catalytic converters containing a three-way conversion (TWC) catalyst are accordingly located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

A catalyzed particulate trap comprising a TWC catalyst coated onto or within a particulate trap is provided in U.S. Pat. No. 8,173,087 (Wei). A gasoline engine emissions treatment system having particulate filters is also provided in U.S. Pat. No. 8,815,189 (Arnold).

Emissions technologies are limited by backpressure and volume constraints of exhaust systems. That is, within defined backpressures and volumes, any new technologies should have minimal to no impact on either.

There is a continuing need to provide a catalyzed filter that provides sufficient and cost-effective TWC in conjunction with an efficient filter without unduly increasing backpressure so that regulated HC, NOx, and CO conversions can be achieved while meeting particulate matter emissions.

SUMMARY

Provided are exhaust systems and components suitable for use in conjunction with gasoline engines to capture particulates in addition to treating gaseous emissions such as hydrocarbons, nitrogen oxides, and carbon monoxides. Of interest is providing a particulate filter for gasoline engines (GPFs or PFGs) for use downstream of a traditional three-way conversion (TWC) so that the combination provides full TWC functionality.

In a first aspect, provided is an emission treatment system downstream of a gasoline direct injection engine for treatment of an exhaust stream comprising hydrocarbons, carbon monoxide, nitrogen oxides, and particulates, the emission treatment system comprising:

a close-coupled three-way conversion (TWC) composite comprising a first TWC catalytic material on a flow-through substrate; and an catalyzed particulate filter located downstream of the close-coupled TWC composite, the catalyzed particulate filter comprising a second TWC catalytic material that permeates walls of a particulate filter;

wherein the second TWC catalytic material comprises rhodium as the only platinum group metal.

The particulate filter may comprise a mean pore diameter in the range of about 13 to about 25 µm. The particulate filter may comprise a wall thickness in the range of about 6 mils (152 µm) to about 14 mils (356 µm) and an uncoated porosity in the range of 55 to 70%. The catalyzed particulate filter may have a coated porosity that is less than an uncoated porosity of the particulate filter. In a detailed embodiment, there is no layering of catalytic material on the surface of the walls of the particulate filter except optionally in areas of overlapped washcoat. In another detailed embodiment, the coated porosity is linearly proportional to a washcoat loading of the TWC catalytic material. The coated porosity may be between 75 and 98% of the uncoated porosity. The coated porosity may be between 80 and 95% of the uncoated porosity. The coated porosity may be between 80 and less than 93% of the uncoated porosity. A coated backpressure of the catalyzed particulate filter is generally non-detrimental to performance of the engine. The second TWC catalytic material may comprise a $d_{90}$ average particle diameter in the range of about 2.5 to about 8 µm. The second TWC catalytic material may be formed from a single washcoat composition that permeates an inlet side, an outlet side, or both of the particulate filter.

A first single washcoat layer may present on the inlet side along up to about 0-100% of the axial length of the particulate filter from the upstream end and a second single washcoat layer may be present on the outlet side along up to about 0-100% of the axial length of the particulate filter from the downstream end, wherein at least one of the first and single washcoat layers is present in an amount of >0%.

A first single washcoat layer may be present on the inlet side along up to about 50-100% of the axial length of the particulate filter from the upstream end and a second single washcoat layer may be present on the outlet side along up to about 50-100% of the axial length of the particulate filter from the downstream end. The first single washcoat layer may be present on the inlet side along up to about 50-55% of the axial length of the particulate filter from the upstream end and the second single washcoat layer may be present on the outlet side along up to about 50-55% of the axial length of the particulate filter from the downstream end.

A single washcoat layer may be present on the inlet side along up to about 100% of the axial length of the particulate filter from the upstream end and there is not a washcoat layer on the outlet side.

A single washcoat layer may be present on the outlet side along up to about 100% of the axial length of the particulate filter from the downstream end and there is not a washcoat layer on the inlet side.

The second TWC catalytic material may be present in an amount in the range of about 0.17 to about 5 g/in³ (about 10 to about 300 g/L).

The second TWC catalytic material may consist essentially of rhodium, ceria or a ceria composite, and alumina.

Another aspect provides a catalyzed particulate filter located in an emission treatment system downstream of a gasoline direct injection engine for treatment of an exhaust stream comprising hydrocarbons, carbon monoxide, nitrogen oxides, and particulates and downstream of a three-way conversion (TWC) composite comprising a first TWC catalytic material on a flow-though substrate, the catalyzed particulate filter comprising:
  a particulate filter comprising a wall thickness in the range of about 6 mils (152 μm) to about 14 mils (356 μm) and a porosity in the range of 55 to 70%; and
  a second three-way conversion (TWC) catalytic material in an amount in the range of about 0.17 to about 5 g/in³ (10 to 300 g/L), the second TWC catalytic material comprising rhodium as the only platinum group metal;
  wherein the catalyzed particulate filter has a coated porosity that is less than an uncoated porosity of the particulate filter and a coated backpressure that is substantially the same as an uncoated backpressure of the particulate filter.

The wall thickness may be about 8 mils; the amount of the second three-way conversion (TWC) catalytic material may be in the range of about 0.17 to about 1.5 g/in³ (10 to 90 g/L), the second TWC catalytic material comprising rhodium as the only platinum group metal; and the particulate filter may comprise a mean pore size distribution in the range of about 13 to about 25 μm. Another aspect is a method of treating an exhaust gas comprising hydrocarbons, carbon monoxide, nitrogen oxides, and particulates, the method comprising: obtaining a catalyzed particulate filter according any embodiment disclosed herein; and locating the catalyzed particulate filter downstream of a gasoline direct injection engine and a three-way conversion (TWC) composite comprising a first TWC catalytic material on a flow-through substrate; wherein upon operating of the engine, exhaust gas from the gasoline direct injection engine contacts the catalyzed particulate filter.

A further aspect is a method of making emission treatment system for a gasoline direct injection engine, the method comprising: positioning a three-way conversion (TWC) composite comprising a first TWC catalytic material on a flow-through substrate downstream of the gasoline direct injection engine; obtaining a catalyzed particulate filter comprising a second three-way conversion (TWC) catalytic material permeating walls of a particulate filter, the particulate filter comprising a wall thickness in the range of about 6 mils (152 μm) to about 14 mils (356 μm) and a porosity in the range of 55 to 70% and the second TWC catalytic material comprising rhodium as the only platinum group metal; positioning the catalyzed particulate filter downstream of the TWC composite.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Provided are filters for gasoline direct injection engines (GDI) that are designed to achieve high particle filtration efficiency and cost-effective gaseous emissions conversion. State of the art gasoline catalytic after-treatment systems generally include two catalysts: a first one close to the engine (e.g., CC: close-coupled position) and a second one downstream of the first one farther along the exhaust aftertreatment system (e.g., UF: under floor position). Catalysts applied in such CC+UF configuration bear different temperature stability and conversion efficiency requirements: the catalyst in CC position, being closer to the engine, requires a higher thermal resistance than the catalyst placed in UF position. Catalyst formulations for FWC herein are designed to provide a cost-effective solution. It is subject of this invention a FWC formulation for UF position that only utilizes a monometallic platinum group metal, rhodium (Rh), as active precious metal, avoiding completely the use of palladium (Pd), thus providing the opportunity to significantly reduce costs.

Historically, TWC formulations used in the UF position comprise, as active precious metal, both Pd and Rh. Pd is commonly used together with both alumina and oxygen storage components to catalyze hydrocarbon (HC) oxidation and to activate the Ce3+/Ce4+ redox reaction respectively. It has been found that the amount of Pd used in TWC catalyst in UF position is not sufficient to significantly reduce HC emissions and that the Ce3+/Ce4+ redox reaction can be effectively activated also by opportune use of only Rh.

The following definitions are used herein.

As used herein, the term "permeate" when used to describe the dispersion of the TWC catalyst into porous walls of a particulate filter means that the particular composition penetrates into at least a majority of the hollow regions within the wall thickness, and becomes deposited on the internal surfaces throughout the thickness of the walls. In this manner the material becomes dispersed throughout the wall of the filter.

Porosity of the particulate filters is a percentage of the volume of pores of the filter relative to the volume of the filter. One way to measure porosity is by mercury porosimetry. A filter may be sectioned, and porosity of each section is measured, and the results are averaged. For example, a filter can be sectioned into a front/inlet piece, a middle piece, and a rear/outlet piece, the porosity of each piece can be taken, and the results can be averaged. An uncoated porosity is the porosity of the filter, which does not have any catalytic material applied to it. A coated porosity is the porosity of a catalyzed filter, which is the combination of catalytic material and a filter. Catalyzed particulate filters can have a coated porosity that is less than an uncoated porosity of the particulate filter, which indicates that the washcoat resides in the pores of the filter and not on the surface of the walls. Some methods used herein result in a coated porosity that is linearly proportional to a washcoat loading of the TWC catalytic material because the material resides in the pores and not on the walls of the filter. The coated porosity may be between 75 and 98%, or 80 and 95%, or even 80 and 93% of the uncoated porosity.

Backpressure of the filters is a measure of resistance of flow through the filter, expressed in, for example, units of mbar. An uncoated backpressure is the backpressure of the filter, which does not have any catalytic material applied to it. A coated backpressure is the backpressure of a catalyzed filter, which is the combination of catalytic material and a filter. Catalyzed particulate filters can have a coated backpressure that is non-detrimental to the performance of the engine. A non-detrimental pressure drop means that the engine will perform generally the same (e.g., fuel consumption) in a wide range of engine operational modes in the presence of a filter substrate that is either in a coated or an uncoated state.

"FWC" refers to four-way conversion where in addition to three-way conversion (TWC) functionality, which is defined next, there is a filtering function.

"TWC" refers to the function of three-way conversion where hydrocarbons, carbon monoxide, and nitrogen oxides are substantially simultaneously converted. A gasoline engine typically operates under near stoichiometric reaction conditions that oscillate or are pertubated slightly between fuel rich and fuel lean air to fuel ratios (A/F ratios) ($\lambda=1\pm\sim0.01$), at perturbation frequencies of 0.5 to 2 Hz. Use of "stoichiometric" herein refers to the conditions of a gasoline engine, accounting for the oscillations or pertubations of A/F ratios near stoichiometric. TWC catalysts include oxygen storage components (OSCs) such as ceria that have multi-valent states which allows oxygen to be held and released under varying air to fuel ratios. Under rich conditions when NOx is being reduced, the OSC provides a small amount of oxygen to consume unreacted CO and HC. Likewise, under lean conditions when CO and HC are being oxidized, the OSC reacts with excess oxygen and/or NOx. As a result, even in the presence of an atmosphere that oscillates between fuel rich and fuel lean air to fuel ratios, there is conversion of HC, CO, and NOx all at the same (or at essentially all the same) time. Typically, a TWC catalyst comprises one or more platinum group metals such as palladium and/or rhodium and optionally platinum; an oxygen storage component; and optionally promoters and/or stabilizers. Under rich conditions, TWC catalysts can generate ammonia.

Reference to "full TWC functionality" means that HC and CO oxidation and NOx reduction can be achieved in accordance with requirements of regulatory agencies and/or car manufacturers. In this way, platinum group metal components such as platinum, palladium, and rhodium are provided to achieve HC, CO, and NOx conversions and sufficient oxygen storage components (OSC) are provided to achieve sufficient oxygen storage capacity to ensure proper HC, NOx, and CO conversion in an environment of varying A/F (air-to-fuel) ratios. Sufficient oxygen storage capacity generally means that after a full useful life aging as defined by a car manufacturer, the catalyst can store and release a minimum amount of oxygen. In one example, a useful oxygen storage capacity can be 100 mg per liter of oxygen. For another example, a sufficient oxygen storage capacity can be 200 mg per liter of oxygen after 80 hours of exothermic aging at 1050° C. Sufficient oxygen storage capacity is needed to ensure that on-board diagnostics (OBD) systems detect a functioning catalyst. In the absence of sufficient oxygen storage capacity, the OBD will trigger an alarm of a non-functioning catalyst. High oxygen storage capacity is more than the sufficient amount, which widens the operating window of the catalyst and permits more flexibility in engine management to a car manufacturer.

Reference to oxygen storage component (OSC) refers to an entity that has multi-valence state and can actively react with oxidants such as oxygen or nitrogen oxides under oxidative conditions, or reacts with reductants such as carbon monoxide (CO) or hydrogen under reduction conditions. Examples of suitable oxygen storage components include ceria. Praseodymia can also be included as an OSC. Delivery of an OSC to the washcoat layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium.

TWC catalysts that exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. The refractory metal oxide supports may be stabilized against thermal degradation by materials such as zirconia, titania, alkaline earth metal oxides such as baria, calcia or strontia or, most usually, rare earth metal oxides, for example, ceria, lanthana and mixtures of two or more rare earth metal oxides. For example, see U.S. Pat. No. 4,171,288 (Keith). TWC catalysts can also be formulated to include an oxygen storage component.

Reference to a "support" in a catalyst washcoat layer refers to a material that receives precious metals, stabilizers, promoters, binders, and the like through association, dispersion, impregnation, or other suitable methods. Examples of supports include, but are not limited to, high surface area refractory metal oxides and composites containing oxygen storage components. High surface refractory metal oxide supports refer to support particles having pores larger than 20 Å and a wide pore distribution. High surface area refractory metal oxide supports, e.g., alumina support materials, also referred to as "gamma alumina" or "activated alumina," typically exhibit a BET surface area in excess of 60 square meters per gram ("m$^2$/g"), often up to about 200 m$^2$/g or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by N$_2$ adsorption.

One or more embodiments include a high surface area refractory metal oxide support comprising an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Examples of composites containing oxygen storage components include, but are not limited to, ceria-zirconia and ceria-zirconia-lanthana. Reference to a "ceria-zirconia composite" means a composite comprising ceria and zirconia, without specifying the amount of either component. Suitable ceria-zirconia composites include, but are not limited to, composites having, for example, 5%, 10%, 15%, 20%, 25%, 30%, 35%, 40%, 45%, 50%, 55%, 60%, 65%, 70%, 75%, 80%, 85%, 90% or even 95% of ceria content. Certain embodiments provide that the support comprises bulk ceria having a nominal ceria content of 100% (i.e., >99% purity).

Before describing several exemplary embodiments of the invention, it is to be understood that the invention is not limited to the details of construction or process steps set forth in the following description. The invention is capable of other embodiments and of being practiced or being carried out in various ways.

Figure 1:
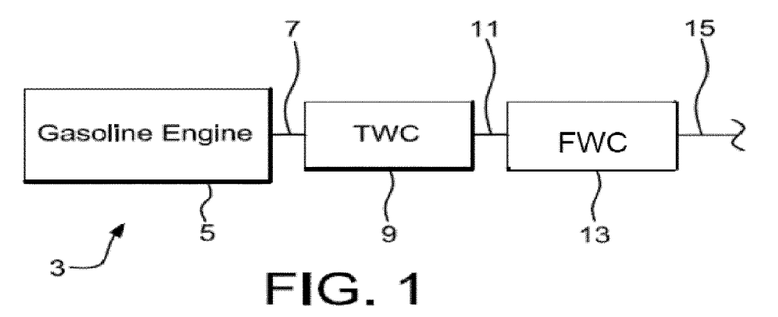
FIG. 1 is a schematic view showing an engine emission treatment system according to a detailed embodiment.

Turning to FIG. 1, an emissions treatment system 3 comprises a gasoline engine 5 that conveys exhaust through line 7 to a first TWC catalyst 9, which is in a close-coupled (CC) position. A downstream TWC-coated particulate filter (FWC) 13, which receives the exhaust stream through line 11, is in an underfloor (UF) position. Line 15 can lead to further treatment components and/or to the tail pipe and out of the system. The TWC-coated particulate filter 13 contains a TWC catalyst loading that is designed to work in conjunction with the CC TWC catalyst in order to collectively provide full TWC functionality, thereby meeting emission requirements.

Particulate Filter

Reference to particulate filter means a substrate so sized and configured to trap particulates generated by the combustion reactions in the direct injection gasoline engine. Trapping of particulates can occur, for example, by use of a particulate (or soot) filter, by use of a flow-through substrate having an internal tortuous path such that a change in direction of flow of the particulates causes them to drop out of the exhaust stream, by use of a metallic substrate, such as a corrugated metal carrier, or by other methods known to those skilled in the art. Other filtration devices may be suitable, such as a pipe with a roughened surface that can knock particles out of the exhaust stream. A pipe with a bend may also be suitable.

Figure 2:
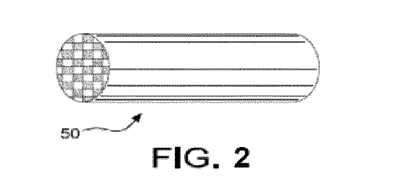
FIG. 2 is a perspective view of a wall flow filter substrate.

With reference to filters, FIG. 2 depicts a perspective view of an exemplary wall flow filter substrate suitable for a particulate filter. Wall flow substrates useful for supporting the TWC or oxidation catalyst compositions have a plurality of fine, substantially parallel gas flow passages extending along the longitudinal axis (or axial length) of the substrate. Typically, each passage is blocked at one end of the substrate body, with alternate passages blocked at opposite end-faces. Such monolithic carriers may contain up to about 300 flow passages (or "cells") per square inch of cross section, although far fewer may be used. For example, the carrier may have from about 7 to 300, more usually from about 200 to 300, cells per square inch ("cpsi"). The cells can have cross sections that are rectangular, square, circular, oval, triangular, hexagonal, or are of other polygonal shapes. Wall flow substrates for FWC typically have a wall thickness between 6-14 mils or 152-356 μm. Axial zoning may be desirable such that a coating is provided along an axial length of the filter. On the inlet side, as measured from the upstream end 54, a coating may extend up to 50% of the axial length (e.g., 1 to 49.9%, or 10 to 45%), 50 to 75% of the axial length, or even 100% of the axial length. On the outlet side, as measured from the downstream end 56, a coating may extend up to 50% of the axial length (e.g., 1 to 49.9%, or 10 to 45%), 50 to 75% of the axial length, or even 100% of the axial length.

Figure 3:
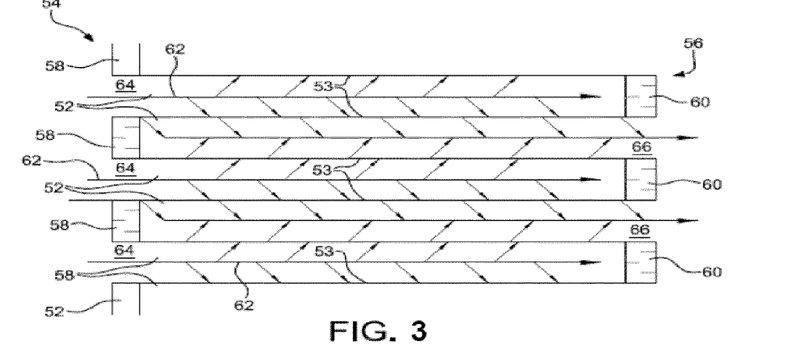
FIG. 3 is a cut-away view of a section of a wall flow filter substrate.

FIGS. 2 and 3 illustrate a wall flow filter substrate 50 that has a plurality of passages 52. The passages are tubularly enclosed by the internal walls 53 of the filter substrate. The substrate has an inlet or upstream end 54 and an outlet or downstream end 56. Alternate passages are plugged at the inlet end with inlet plugs 58 and at the outlet end with outlet plugs 60 to form opposing checkerboard patterns at the inlet 54 and outlet 56. A gas stream 62 enters at upstream end 54 through the unplugged channel inlet 64, is stopped by outlet plug 60 and diffuses through channel walls 53 (which are porous) to the outlet side 66. A coating on the inlet side of the filter means that the coating resides on or within the walls 53 such that the gas stream 62 contacts the inlet coating first. A coating on the outlet side of the filter means that the coating resides on or within the walls 53 such that the gas stream 62 contacts the outlet coating after the inlet coating. The gas cannot pass back to the inlet side of walls because of inlet plugs 58.

Figure 4:
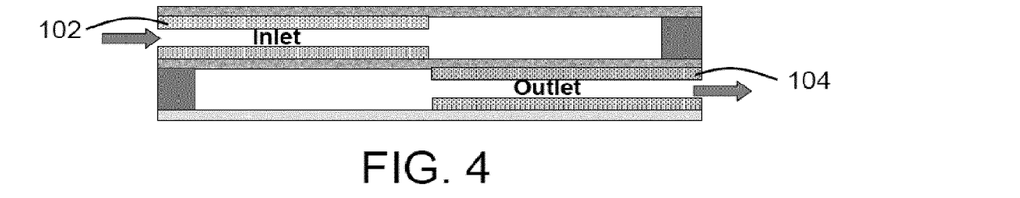
FIGS. 4-6 provide schematic views of FWC coating designs.
Figure 5:
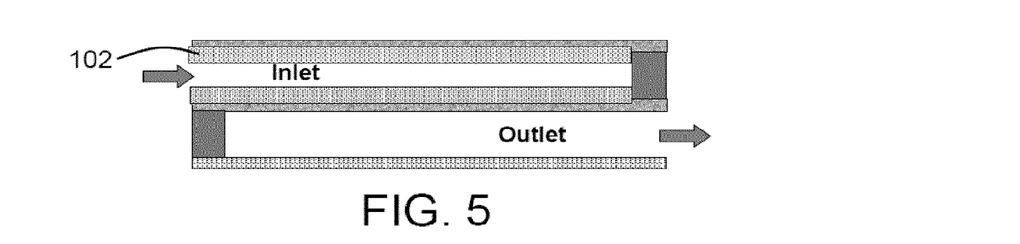
Figure 6:
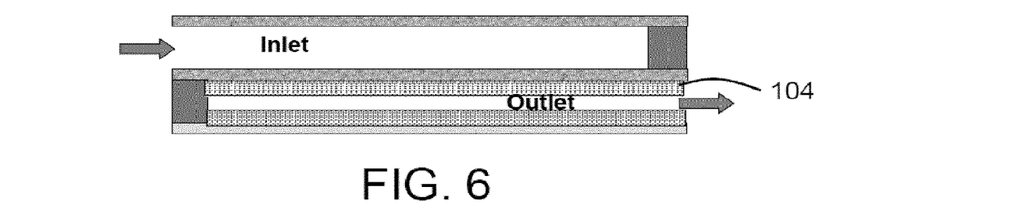

In FIG. 4, a first washcoat 102 is provided 50-55% of the length of the inlet side and a second washcoat 104 is provided 50-55% of the length of the outlet side. The embodiment of FIG. 4 may be suitable for high washcoat loadings, where overall washcoat loading is ≥1.5 g/in$^3$, for example: 1.5-3 g/in$^3$, or even 2.5 g/in$^3$. In FIG. 5, a single washcoat 102 is provided up to 100% of the length of the inlet side, which includes >0% to 100% and all values in between, and there is not a washcoat provided on the outlet side. The embodiment of FIG. 5 may be suitable for low washcoat loadings, where overall washcoat loading is <1.5 g/in$^3$, for example: 0.25-<1.5 g/in$^3$, or even 0.5-1.0 g/in$^3$. In FIG. 6, a single washcoat 104 is provided up to 100% of the length of the outlet side, which includes >0% to 100% and all values in between, and there is not a washcoat provided on the inlet side. The embodiment of FIG. 6 may also be suitable for low washcoat loadings, where overall washcoat loading is <1.5 g/in$^3$, for example: 0.25-<1.5 g/in$^3$, or even 0.5-1.0 g/in$^3$. In FIGS. 4-6, the washcoats may be located on and/or permeate the walls. In a preferred embodiment, the washcoat permeates the walls and is not located on the walls.

Wall flow filter substrates can be composed of ceramic-like materials such as cordierite, alumina, silicon carbide, aluminum titanate, mullite, or of refractory metal. Wall flow substrates may also be formed of ceramic fiber composite materials. Specific wall flow substrates are formed from cordierite, silicon carbide, and aluminum titanate. Such materials are able to withstand the environment, particularly high temperatures, encountered in treating the exhaust streams. Wall flow substrates for use in the inventive system can include thin porous walled honeycombs (monoliths) through which the fluid stream passes without causing too great an increase in back pressure or pressure across the article. Ceramic wall flow substrates used in the system can be formed of a material having a porosity (also referred to as uncoated porosity) of at least 40% (e.g., from 40 to 70% or even 55 to 70%). Useful wall flow substrates can have an mean pore size of 10 or more microns, preferably 13 to 25 microns. When substrates with these porosities and these mean pore sizes are coated with the techniques described below, adequate levels of TWC compositions can be loaded onto the substrates to achieve excellent hydrocarbon, CO, and/or NOx conversion efficiency. These substrates are still able retain adequate exhaust flow characteristics, i.e., acceptable back pressures, despite the catalyst loading.

The porous wall flow filter used in this invention is catalyzed in that the wall of the element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more washcoats of catalytic materials and combinations of one or more washcoats of catalytic materials on the inlet and/or outlet walls of the element.

With reference to a metallic substrate, a useful substrate may be composed of one or more metals or metal alloys. The metallic carriers may be employed in various shapes such as corrugated sheet or monolithic form. Specific metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface of the metal carriers may be oxidized at high temperatures, e.g., 1000° C. and higher, to improve the resistance to corrosion of the alloys by forming an oxide layer on the surfaces of the carriers. Such high temperature-induced oxidation may enhance adherence of a catalytic material to the carrier.

Coating Wall Flow Filters

To coat wall flow filters with the TWC or oxidation catalyst composition using a traditional technique, a mixture of ingredients is prepared using metal salts, which are usually a mixture of organic and inorganic salts, to form a catalyst slurry. Such slurries may typically have a dynamic viscosity of 14 to 400 mPa·s at 20° C. or greater with a solids content in the range of 25% to 0% of solids. Substrates are immersed vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30-60 seconds. The filter is removed from the slurry, and excess slurry is removed from the wall flow filter first by allowing it to drain from the channels, then by blowing with compressed air (against the direction of slurry penetration). By using this traditional technique, the catalyst slurry permeates the walls of the filter, yet the pores are not occluded to the extent that undue back pressure will build up in the finished filter. By using this traditional technique, the coated porosity of the filter is expected to be substantially the same as its uncoated porosity. The coated filters are dried typically at about 100° C. and calcined at a higher temperature (e.g., 300 to 450° C. and up to 590° C.). After calcining, the catalyst loading can be determined through calculation of the coated and uncoated weights of the filter. As will be apparent to those of skill in the art, the catalyst, loading can be modified by altering the solids content of the coating slurry. Alternatively, repeated immersions of the filter in the coating slurry can be conducted, followed by removal of the excess slurry as described above.

To coat wall flow filters with the TWC or oxidation catalyst composition using an improved technique, a mixture of ingredients is prepared using inorganic metal salts only to form a catalyst slurry that has a low viscosity relative to the traditional technique. Such slurries may typically have a dynamic viscosity in the range of ~5 to less than 40 mPa·s at 20° C., or ~5 to less than 30 mPa·s, with a solids content in the range of 25% to 0%. The slurry viscosity is much lower than the traditional technique by at least 50% or even more such as 75-90%. The number of processing steps is reduced compared to the traditional technique. Substrates are immersed vertically in a portion of the catalyst slurry for the length of the substrate equal to the targeted length of the coat to be applied. In this manner, slurry contacts the inlet face of each honeycomb wall and penetrates the wall completely for the length of immersion. The sample is left in the slurry for about 1-6 seconds. The filter is removed from the slurry, and excess slurry is removed from the wall flow filter first by allowing it to drain from the channels, then by blowing with compressed air (against the direction of slurry penetration). By using this improved technique, the catalyst slurry permeates the walls of the filter, yet the pores are not occluded to the extent that undue back pressure will build up in the finished filter. By using this improved technique, the coated porosity of the filter is lower than its uncoated porosity in that the washcoat resides primarily to completely in the pores of the filter and not on the surface of the walls. Furthermore, relative to the traditional technique, improved homogeneity of slurry distribution along the coated length is achieved due to more efficient penetration of the low viscous slurry into the walls. Finally, by using such technique and as a result of the improved slurry penetration into the wall and homogeneity, lower back pressure increase is achieved relative of the finished filter relative to the traditional technique described above. The coated filters are dried typically at about 100° C. and calcined at a higher temperature (e.g., 300 to 450° C. and up to 590° C.). After calcining, the catalyst loading can be determined through calculation of the coated and uncoated weights of the filter. As will be apparent to those of skill in the art, the catalyst, loading can be modified by altering the solids content of the coating slurry. Alternatively, repeated immersions of the filter in the coating slurry can be conducted, followed by removal of the excess slurry as described above.

Preparation of Catalyst Composite Washcoats

The catalyst composites may be formed in a single layer or multiple layers. In some instances, it may be suitable to prepare one slurry of catalytic material and use this slurry to form multiple layers on the carrier. The composites can readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated. A "washcoat layer," therefore, is defined as a coating that is comprised of support particles. A "catalyzed washcoat layer" is a coating comprised of support particles impregnated with catalytic components.

The catalyst composite can be readily prepared in layers on a carrier. For a first layer of a specific washcoat, finely divided particles of a high surface area refractory metal oxide such as gamma alumina are slurried in an appropriate vehicle, e.g., water. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Typically, when palladium is desired, the palladium component is utilized in the form of a compound or complex to achieve dispersion of the component on the refractory metal oxide support, e.g., activated alumina. The term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate.

A suitable method of preparing any layer of the layered catalyst composite of the invention is to prepare a mixture of a solution of a desired precious metal compound (e.g., palladium compound) and at least one support, such as a finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having, for example, a pH of about 2 to less than about 7, or preferably in the range of 3-5. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry.

In one embodiment, the slurry is thereafter comminuted to result in substantially all of the solids having particle sizes of less than about 30 microns, i.e., between about 0.1-15 microns, in an average diameter. An exemplary $d_{90}$ average particle diameter is in the range of about 2.5 to about 8 μm. The comminution may be accomplished in a ball mill, circular mill, or other similar equipment, and the solids content of the slurry may be, e.g., about 20-60 wt. %, more particularly about 30-40 wt. %.

Additional layers, i.e., the second and third layers may be prepared and deposited upon the first layer in the same manner as described above for deposition of the first layer upon the carrier.

EMBODIMENTS

Various embodiments are listed below. It will be understood that the embodiments listed below may be combined with all aspects and other embodiments in accordance with the scope of the invention.

Embodiment 1. An emission treatment system downstream of a gasoline direct injection engine for treatment of an exhaust stream comprising hydrocarbons, carbon monoxide, nitrogen oxides, and particulates, the emission treatment system comprising:

a close-coupled three-way conversion (TWC) composite comprising a first TWC catalytic material on a flow-through substrate; and an catalyzed particulate filter located downstream of the close-coupled TWC composite, the catalyzed particulate filter comprising a second TWC catalytic material that permeates walls of a particulate filter;

wherein the second TWC catalytic material comprises rhodium as the only platinum group metal.

Embodiment 2. The emission treatment system of embodiment 1, wherein the particulate filter comprises a mean pore diameter in the range of about 13 to about 25 μm.

Embodiment 3. The emission treatment system of any of embodiments 1-2, wherein the particulate filter comprises a wall thickness in the range of about 6 mils (152 μm) to about 14 mils (356 μm) and an uncoated porosity in the range of 55 to 70%.

Embodiment 3.5: The emission treatment system of any of embodiments 1-3, wherein the uncoated porosity is a percentage of volume of pores of the particulate filter relative to volume of the particulate filter.

Embodiment 4. The emission treatment system of any of embodiments 1-3.5, wherein the catalyzed particulate filter has a coated porosity that is less than an uncoated porosity of the particulate filter.

Embodiment 5. The emission treatment system of any of embodiments 1-4, wherein there is no layering of catalytic material on the surface of the walls of the particulate filter except optionally in areas of overlapped washcoat.

Embodiment 5.5. The emission treatment system of any of embodiments 1-5, wherein there is no catalytic material outside pores of the walls of the particulate filter.

Embodiment 6. The emission treatment system of embodiment 4 or 5 or 5.5, wherein the coated porosity is linearly proportional to a washcoat loading of the TWC catalytic material.

Embodiment 7. The emission treatment system of any of embodiments 4-6, wherein the coated porosity is between 75 and 98% of the uncoated porosity.

Embodiment 8. The emission treatment system of any of embodiments 4-7, wherein the coated porosity is between 80 and 95% of the uncoated porosity.

Embodiment 9. The emission treatment system of any of embodiments 1-8, wherein a coated backpressure of the catalyzed particulate filter is non-detrimental to performance of the engine.

Embodiment 10. The emission treatment system of any of embodiments 1-9, wherein the second TWC catalytic material comprises a $d_{90}$ average particle diameter in the range of about 2.5 to about 8 μm.

Embodiment 11. The emission treatment system of any of embodiments 1-10, wherein the second TWC catalytic material is formed from a single washcoat composition that permeates an inlet side, an outlet side, or both of the particulate filter.

Embodiment 12. The emissions treatment system of any of embodiments 1-11, wherein a first single washcoat layer is present on the inlet side along up to about 0-100% of the axial length of the particulate filter from the upstream end and a second single washcoat layer is present on the outlet side along up to about 0-100% of the axial length of the particulate filter from the downstream end, wherein at least one of the first and single washcoat layers is present in an amount of >0%.

Embodiment 13. The emissions treatment system of embodiment 12, wherein a first single washcoat layer is present on the inlet side along up to about 50-100% of the axial length of the particulate filter from the upstream end and a second single washcoat layer is present on the outlet side along up to about 50-100% of the axial length of the particulate filter from the downstream end.

Embodiment 14. The emissions treatment system of embodiment 13, wherein the first single washcoat layer is present on the inlet side along up to about 50-55% of the axial length of the particulate filter from the upstream end and the second single washcoat layer is present on the outlet side along up to about 50-55% of the axial length of the particulate filter from the downstream end.

Embodiment 15. The emissions treatment system of any of embodiments 1-11 wherein a single washcoat layer is present on the inlet side along up to about 100% of the axial length of the particulate filter from the upstream end and there is not a washcoat layer on the outlet side.

Embodiment 16. The emissions treatment system of any of embodiments 1-11, wherein a single washcoat layer is present on the outlet side along up to about 100% of the axial length of the particulate filter from the downstream end and there is not a washcoat layer on the inlet side.

Embodiment 17. The emission treatment system of any of embodiments 1-16 comprising the second TWC catalytic material in an amount in the range of about 0.17 to about 5 g/in$^3$ (about 10 to about 300 g/L).

Embodiment 18. The emission treatment system of any of embodiments 1-17, wherein the second TWC catalytic material consists essentially of rhodium, ceria or a ceria composite, and alumina.

Embodiment 19. A catalyzed particulate filter located in an emission treatment system downstream of a gasoline direct injection engine for treatment of an exhaust stream comprising hydrocarbons, carbon monoxide, nitrogen oxides, and particulates and downstream of a three-way conversion (TWC) composite comprising a first TWC catalytic material on a flow-though substrate, the catalyzed particulate filter comprising:
    a particulate filter comprising a wall thickness in the range of about 6 mils (152 μm) to about 14 mils (356 μm) and a porosity in the range of 55 to 70%; and
    a second three-way conversion (TWC) catalytic material in an amount in the range of about 0.17 to about 5 g/in$^3$ (10 to 300 g/L), the second TWC catalytic material comprising rhodium as the only platinum group metal;
    wherein the catalyzed particulate filter has a coated porosity that is less than an uncoated porosity of the particulate filter and a coated backpressure that is substantially the same as an uncoated backpressure of the particulate filter.

Embodiment 19.5. The catalyzed particulate filter of embodiment 19, wherein the porosity is a percentage of volume of pores of the particulate filter relative to volume of the particulate filter.

Embodiment 20. The catalyzed particulate filter of any of embodiments 19-19.5, wherein:
    the wall thickness is about 8 mils;
    the amount of the second three-way conversion (TWC) catalytic material is in the range of about 0.17 to about 1.5 g/in$^3$ (10 to 90 g/L), the second TWC catalytic material comprising rhodium as the only platinum group metal; and
    the particulate filter comprises a mean pore size distribution in the range of about 13 to about 25 μm.

Embodiment 21. A method of treating an exhaust gas comprising hydrocarbons, carbon monoxide, nitrogen oxides, and particulates, the method comprising:
    obtaining a catalyzed particulate filter according to any of embodiments 1-19.5; and
    locating the catalyzed particulate filter downstream of a gasoline direct injection engine and a three-way conversion (TWC) composite comprising a first TWC catalytic material on a flow-through substrate;
    wherein upon operation of the engine, exhaust gas from the gasoline direct injection engine contacts the catalyzed particulate filter.

Embodiment 22. A method of making emission treatment system for a gasoline direct injection engine, the method comprising:
    positioning a three-way conversion (TWC) composite comprising a first TWC catalytic material on a flow-through substrate downstream of the gasoline direct injection engine;
    obtaining a catalyzed particulate filter comprising a second three-way conversion (TWC) catalytic material permeating walls of a particulate filter, the particulate filter comprising a wall thickness in the range of about 6 mils (152 μm) to about 14 mils (356 μm) and a porosity in the range of 55 to 70% and the second TWC catalytic material comprising rhodium as the only platinum group metal;
    positioning the catalyzed particulate filter downstream of the TWC composite.

Embodiment 23. The method of embodiment 22, wherein the porosity is a percentage of volume of pores of the particulate filter relative to volume of the particulate filter.

EXAMPLES

The following non-limiting examples shall serve to illustrate the various embodiments of the present invention. In each of the examples, the carrier is a wall-flow cordierite. In each of the examples, porosity is a percentage of volume of pores of the particulate filter relative to volume of the particulate filter. The examples were made according to the improved coating technique discussed previously using slurries having a dynamic viscosity in the range of about 5 to less than 40 mPa·s at 20° C.

Example 1

Comparative

A comparative particulate filter of low porosity having a three-way conversion (TWC) catalyst within the substrate wall was prepared at a washcoat loading of 1 g/in$^3$ (61 g/l). The filter substrate had: an oval front face with major axis of 184.9 mm and minor axis of 89.9 mm, an overall length of 120 mm, 300 CPSI with wall thickness of 8 mil (204 μm). The precious metal loading was fixed to 30 g/ft$^3$ with a precious metal ratio Pt/Pd/Rh of 0/25/5. The Pd was supported on a ceria-zirconia oxygen storage component comprising 40% ceria, and the Rh was supported on an alumina component. The filter substrate had a 48% porosity and a mean pore diameter of 13 μm.

Example 2

An inventive particulate filter having a three-way conversion (TWC) catalyst within the substrate wall was prepared at a washcoat loading of 1 g/in$^3$ (61 g/l). The filter substrate had the same characteristics as in Example 1. The monometallic platinum group metal loading was fixed to 7 g/ft$^3$ with a precious metal ratio Pt/Pd/Rh of 0/0/7, thus resulting in a coated filter substrate having only Rh as precious metal.

The Rh was supported on alumina. A ceria-zirconia oxygen storage component comprising 40% ceria was also present in the catalyst.

Example 3

The particle filters of Examples 1 and 2 each having 1 g/in$^3$ (61 g/l) washcoat were aged at 830° C. bed temperature for 50 hours on engine. The particulate filters were measured under New European Drive Cycle (NEDC) in underfloor position after the same flow-through TWC catalyst in close-coupled (CC) position. The close-coupled catalyst was a state of the art TWC catalyst with an overall precious metal loading of 95 g/ft$^3$ and Pt/Pd/Rh metal ratio of 0/90/5. The washcoat loading of the TWC catalyst in the close-coupled position was 3.8 g/in$^3$. The TWC catalyst has been aged at a temperature of 1030° C. for 150 hours on engine. Emissions of total hydrocarbon (HC), carbon monoxide (CO), nitrogenous oxides (NOx) as well as particulate number according to the PMP protocol were measured for the close-coupled and under floor catalyst and reported in Table 1.

TABLE 1

| | Position | Example 1 Comparative | Example 2 | Euro 6 Std* |
|---|---|---|---|---|
| HC (g/km) | CC | 0.0417 | 0.0360 | — |
| CO (g/km) | CC | 1.4282 | 1.3565 | — |
| NOx (g/km) | CC | 0.0685 | 0.0645 | — |
| HC (g/km) | Tail Pipe | 0.0370 | 0.0341 | 0.1 |
| CO (g/km) | Tail Pipe | 1.0391 | 0.8926 | 1.0 |
| NOx (g/km) | Tail Pipe | 0.0219 | 0.0238 | 0.068 |
| Particulate Number (#/km) | Tail Pipe | 6.85E+11 | 5.62E+11 | 6.00E+11 |
| HC (%) | UF | 11.3 | 5.2 | — |
| CO (%) | UF | 27.2 | 34.2 | — |
| NOx (%) | UF | 68.0 | 63.2 | — |
| Particulate Number Filtration Efficiency (%) | — | | 52.3 | 60.9 | — |

*European Commission.

The efficiency conversion of the particulate filter of Example 2 is substantially the same as that of the comparative particulate filter of Example 1 with respect to the conversion of gaseous emissions as well as particle number emissions but at lower platinum group metal loading and cost. To a person skilled in the art, it is evident that the particle filtration efficiency is not affected by the nature of the platinum group metal used in the examples but rather by the filter characteristics and amount of washcoat loading. Thus it is of relevance in Example 3 that conversion of gaseous emissions HC, CO and NOx are substantially the same between Example 1 and Example 2.

Example 4

Comparative

A comparative particulate filter of high porosity having a three-way conversion (TWC) catalyst within the substrate wall was prepared at a washcoat loading of 0.83 g/in$^3$ (50 g/l). The filter substrate had: a round face with diameter of 143.8 mm and length of 152.4 mm, 300 CPSI with wall thickness of 8 mil (204 μm). The precious metal loading was fixed to 3 g/ft$^3$ with a precious metal ratio Pt/Pd/Rh of 0/1/2. The Pd was supported on a ceria-zirconia oxygen storage component comprising 40% ceria, and the Rh was supported on alumina. The filter substrate had a 65% porosity and a mean pore diameter of 20 μm.

Example 5

An inventive particulate filter having a three-way conversion (TWC) catalyst within the substrate wall was prepared at a washcoat loading of 1.16 g/in$^3$ (70 g/I). The filter substrate had the same characteristics as in Example 4. The monometallic platinum group metal loading was fixed to 3 g/ft$^3$ with a precious metal ratio Pt/Pd/Rh of 0/0/3, thus resulting in a coated filter substrate having only Rh as precious metal. The Rh was supported on an alumina component. A ceria-zirconia oxygen storage component comprising 40% ceria was also present in the catalyst.

Example 6

The particle filters of Examples 4 and 5 were tested as-in in their fresh state. The particulate filters were measured under New European Drive Cycle (NEDC) in underfloor position after the same flow-through TWC catalyst in close-coupled (CC) position. The close-coupled catalyst was the same as used in Example 3. Emissions of total hydrocarbon (HC), carbon monoxide (CO), nitrogenous oxides (NOx) as well as particulate number according to the PMP protocol were measured for the close-coupled and under floor catalyst and reported in Table 2.

TABLE 2

| | Position | Example 4 Comparative | Example 5 | Euro 6 Std* |
|---|---|---|---|---|
| HC (g/km) | CC | 0.030 | 0.035 | — |
| CO (g/km) | CC | 1.042 | 1.226 | — |
| NOx (g/km) | CC | 0.063 | 0.083 | — |
| HC (g/km) | Tail Pipe | 0.027 | 0.032 | 0.1 |
| CO (g/km) | Tail Pipe | 0.652 | 0.605 | 1.0 |
| NOx (g/km) | Tail Pipe | 0.020 | 0.027 | 0.068 |
| Particulate Number (#/km) | Tail Pipe | 3.89E+11 | 5.2E+11 | 6.00E+11 |
| HC (%) | UF | 10 | 8.5 | — |
| CO (%) | UF | 41.6 | 50.7 | — |
| NOx (%) | UF | 68.2 | 67.4 | — |
| Particulate Number Filtration Efficiency (%) | — | | 72.9 | 63.8 | — |

*European Commission.

The efficiency conversion of the composite is Example 5 is substantially the same as that of the state of the art composite of Example 4 with respect to the conversion of gaseous emissions as well as particle number emissions but using only Rh as platinum group metal.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

The invention claimed is:

1. An emission treatment system downstream of a gasoline direct injection engine for treatment of an exhaust stream comprising hydrocarbons, carbon monoxide, nitrogen oxides, and particulates, the emission treatment system comprising:
a close-coupled three-way conversion (TWC) composite comprising a first TWC catalytic material supported on a flow-through substrate; and
a catalyzed particulate filter located downstream of the dose-coupled TWC composite, the catalyzed particulate filter comprising a second TWC catalytic material that permeates walls of a particulate filter,
wherein the second TWC catalytic material comprises rhodium as the only platinum group metal, a support, and an oxygen storage component,
wherein the catalyzed particulate filter has a coated porosity ranging from 75% to 98% of an uncoated porosity of the particulate filter.

2. The emission treatment system of claim 1, wherein the particulate filter comprises has a mean pore diameter ranging from about 13 to about 25 μm.

3. The emission treatment system of claim 1, wherein there is no layering of catalytic material on the surface of the walls of the particulate filter except optionally in areas of overlapped washcoat.

4. The emission treatment system of claim 1, wherein the coated porosity is linearly proportional to a washcoat loading of the second TWC catalytic material.

5. The emission treatment system of claim 1, wherein the second TWC catalytic material has a d90 average particle diameter in the range of from 2.5 to 8 μm.

6. The emission treatment system of claim 1, wherein the second TWC catalytic material is formed from a single washcoat composition that permeates an inlet side, an outlet side, or both of the particulate filter.

7. The emissions treatment system of claim 1, wherein a first single washcoat layer is present on the inlet side along up to a range of from 0 to 100% of the axial length of the particulate filter from the upstream end and a second single washcoat layer is present on the outlet side along up to 0 to 100% of the axial length of the particulate filter from the downstream end, and wherein at least one of the first and single washcoat layers is present in an amount of >0%.

8. The emissions treatment system of claim 7, wherein a first single washcoat layer is present on the inlet side along up to a range of from 50 to 100% of the axial length of the particulate filter from the upstream end and wherein a second single washcoat layer is present on the outlet side along up to from 50 to 100% of the axial length of the particulate filter from the downstream end.

9. The emission treatment system of claim 8, wherein the first single washcoat layer is present on the inlet side along up to a range of from 50 to 55% of the axial length of the particulate filter from the upstream end and wherein the second single washcoat layer is present on the outlet side along up to from 50 to 55% of the axial length of the particulate filter from the downstream end.

10. The emission treatment system of claim 1, wherein a single washcoat layer is present on the inlet side along up to 100% of the axial length of the particulate filter from the upstream end and there is not a washcoat layer on the outlet side.

11. The emissions treatment system of claim 1, wherein a single wash coat layer is present on the outlet side along up to 100% of the axial length of the particulate filter from the downstream end and there is not a washcoat layer on the inlet side.

12. The emission treatment system of claim 1, wherein the second TWC catalytic material is present in an amount ranging from 0.17 g/in$^3$ to 5 g/in$^3$ (10 g/L to 300 g/L).

13. The emission treatment system of claim 1, wherein the second TWC catalytic material consists essentially of rhodium, ceria or a ceria composite, and alumina.

14. The emission treatment system of claim 1, wherein the second TWC catalytic material is present in an amount ranging from 0.25 g/in$^3$ to 1.5 g/in$^3$.

15. The emission treatment system of claim 1, wherein the oxygen storage component comprises ceria ranging from 30 wt. % to 60 wt. %.

16. A catalyzed particulate filter located in an emission treatment system downstream of a gasoline direct injection engine for treatment of an exhaust stream comprising hydrocarbons, carbon monoxide, nitrogen oxides, and particulates and downstream of a three-way conversion (TWC) composite comprising a first TWC catalytic material on a flow-though substrate, the catalyzed particulate filter comprising:
a particulate filter having a wall thickness ranging from 6 mils (152 μm) to 14 mils (356 μm) and a porosity ranging from 55% to 70%; and
a second three-way conversion (TWC) catalytic material in an amount ranging from 0.17 g/in$^3$ to 5 g/in$^3$ (10 g/L to 300 g/L), wherein the second TWC catalytic material comprises rhodium as the only platinum group metal,
wherein the catalyzed particulate filter has a coated porosity that is less than an uncoated porosity of the particulate filter and a coated backpressure that is substantially the same as an uncoated backpressure of the particulate filter.

17. The catalyzed particulate filter of claim 16, wherein the wall thickness is 8 mils;
the amount of the second three-way conversion (TWC) catalytic material ranges from 0.17 g/in$^3$ to 1.5 g/in$^3$ (10 g/L to 90 g/L), the second TWC catalytic material comprising rhodium as the only platinum group metal; and
the particulate filter has a mean pore size distribution in a range of from 13 to 25 pm.

18. A method of treating an exhaust gas comprising hydrocarbons, carbon monoxide, nitrogen oxides, and particulates, the method comprising situating the catalyzed particulate filter of claim 16 downstream of a gasoline direct injection engine and a three-way conversion (TWC) composite comprising a first TWC catalytic material on a flow-through substrate, wherein upon operation of the engine, exhaust gas from the gasoline direct injection engine contacts the catalyzed particulate filter.

19. A method of making emission treatment system for a gasoline direct injection engine, the method comprising: positioning a three-way conversion (TWC) composite comprising a first TWC catalytic material on a flow-through substrate downstream of the gasoline direct injection engine; and positioning the catalyzed particulate filter downstream of the TWC composite, wherein the catalyzed particulate filter comprises a second three-way conversion (TWC) catalytic material permeating walls of a particulate filter, the particulate filter having a wall thickness ranging from 6 mils (152 μm) to 14 mils (356 μm) and a porosity in a range of from 55% to 70%; and wherein the second TWC catalytic material comprises rhodium as the only platinum group metal.

* * * * *